[12] United States Patent
An et al.

(10) Patent No.: US 9,502,180 B2
(45) Date of Patent: Nov. 22, 2016

(54) MULTILAYER CERAMIC CAPACITOR

(71) Applicant: SAMSUNG ELECTRO-MECHANICS CO., LTD., Suwon-Si, Gyeonggi-Do (KR)

(72) Inventors: Kang Sun An, Suwon-Si (KR); Byung Kil Seo, Suwon-Si (KR)

(73) Assignee: SAMSUNG ELECTRO-MECHANICS CO., LTD., Suwon-Si, Gyeonggi-Do ( * ) Notice: Subject to any disclaimer, the term of this patent is extended or adjusted under 35 U.S.C. 154(b) by 340 days.

(21) Appl. No.: 14/196,965

(22) Filed: Mar. 4, 2014

(65) Prior Publication Data

US 2015/0170842 A1 Jun. 18, 2015

(30) Foreign Application Priority Data

Dec. 16, 2013 (KR) ........................ 10-2013-0156582

(51) Int. Cl.
*H01G 4/005* (2006.01)
*H01G 4/30* (2006.01)
*H01G 4/012* (2006.01)
*H01G 4/12* (2006.01)

(52) U.S. Cl.
CPC ............... *H01G 4/30* (2013.01); *H01G 4/012* (2013.01); *H01G 4/12* (2013.01)

(58) Field of Classification Search
USPC ............................................. 361/301.4, 303
See application file for complete search history.

(56) References Cited

U.S. PATENT DOCUMENTS

| 4,513,350 A * | 4/1985 | Coleman ............... H01G 4/255 29/25.42 |
| 7,710,233 B2 † | 5/2010 | Feichtinger |
| 2008/0165468 A1 † | 7/2008 | Berolini et al. |
| 2010/0220426 A1 | 9/2010 | Shimizu |
| 2012/0307418 A1 | 12/2012 | Kim et al. |
| 2013/0319742 A1 † | 12/2013 | Ahn et al. |

FOREIGN PATENT DOCUMENTS

| JP | 03206606 A | * | 9/1991 |
| JP | 08273977 A | * | 10/1996 |
| JP | 4929487 B2 | | 5/2012 |
| KR | 10-2012-0133716 | | 12/2012 |

\* cited by examiner
† cited by third party

*Primary Examiner* — Eric Thomas
(74) *Attorney, Agent, or Firm* — McDermott Will & Emery LLP

(57) ABSTRACT

A multilayer ceramic capacitor may include: a ceramic body; first and second external electrodes; first and second internal electrodes connected to the first and second external electrodes, respectively; first floating electrodes having both end portions overlapped with portions of the first and second internal electrodes, respectively; and at least one second floating electrode shifted with respect to the first floating electrodes in a length direction of the ceramic body. The lengths of portions of the first and second floating electrodes overlapped with the portions of the first internal electrodes may be different from those of portions of the first and second floating electrodes overlapped with the portions of the second internal electrodes.

18 Claims, 7 Drawing Sheets

A-A'

MULTILAYER CERAMIC CAPACITOR

CROSS-REFERENCE TO RELATED APPLICATION

This application claims the benefit of Korean Patent Application No. 10-2013-0156582 filed on Dec. 16, 2013, with the Korean Intellectual Property Office, the disclosure of which is incorporated herein by reference.

BACKGROUND

The present disclosure relates to a multilayer ceramic capacitor.

A multilayer ceramic capacitor (MLCC), which is one of multilayer chip electronic components, is capable of being used in various electronic devices, due to advantages such as a small size, high capacitance, easiness of mounting, or the like.

For example, the multilayer ceramic capacitor is a chip-type condenser that is mounted on printed circuit boards of various electronic products such as display devices including liquid crystal displays (LCDs) and plasma display panels (PDPs), computers, personal digital assistants (PDAs), cell phones, and the like, to allow electricity to be charged therein and discharged therefrom.

In general, a multilayer ceramic capacitor having high voltage and low capacitance characteristics has an internal electrode structure using floating electrodes in order to exhibit the high voltage and the low capacitance characteristics.

For example, in a case in which the multilayer ceramic capacitor having high voltage and low capacitance according to the related art is designed to have an internal electrode structure using floating electrodes so as to obtain low capacitance by stacking a plurality of relatively thick dielectric layers and 10 or less internal electrodes, a buffer layer needs to be additionally inserted between the floating electrode and the internal electrode in order to meet a target capacitance, and thus, an interval between the floating electrode and the internal electrode increases.

However, a final multilayer ceramic capacitor may fail to obtain the target capacitance due to the design of the above-described internal electrode structure using the floating electrodes, and accordingly, manufacturing yield may decrease. In addition, the internal electrode structure using the floating electrodes may reduce the number of internal electrodes having connectivity with external electrodes, whereby conductivity may be deteriorated and equivalent series resistance (ESR) may increase.

SUMMARY

An aspect of the present disclosure may provide a multilayer ceramic capacitor having high voltage and low capacitance characteristics, in which an internal electrode structure including floating electrodes is used, capable of minutely adjusting capacitance by adjusting lengths of overlap portions between internal electrodes and floating electrodes by using an offset value and reducing a difference in capacitance between a preliminary product and a final product, without increasing a thickness of a dielectric layer or increasing the number of stacked internal electrodes.

According to an aspect of the present disclosure, a multilayer ceramic capacitor may include: a ceramic body having a plurality of dielectric layers stacked therein; first and second external electrodes disposed on both end surfaces of the ceramic body, respectively; first and second internal electrodes disposed on one dielectric layer to be spaced apart from each other within the ceramic body and exposed through the end surfaces of the ceramic body to be electrically connected to the first and second external electrodes, respectively; first floating electrodes misaligned with the first and second internal electrodes in a thickness direction of the ceramic body within the ceramic body and having both end portions overlapped with portions of the first and second internal electrodes, respectively; and at least one second floating electrode misaligned with the first and second internal electrodes in the thickness direction of the ceramic body within the ceramic body, having both end portions overlapped with portions of the first and second internal electrodes, respectively, and shifted with respect to the first floating electrodes in a length direction of the ceramic body, wherein lengths of portions of the first and second floating electrodes overlapped with the portions of the first internal electrodes may be different from those of portions of the first and second floating electrodes overlapped with the portions of the second internal electrodes.

According to another aspect of the present disclosure, a multilayer ceramic capacitor may include: a ceramic body having a plurality of dielectric layers stacked therein; first and second external electrodes disposed on both end surfaces of the ceramic body, respectively; first and second internal electrodes adjacent to each other in the ceramic body in a thickness direction thereof and formed in pairs, spaced apart from each other and exposed through the end surfaces of the ceramic body to be electrically connected to the first and second external electrodes, respectively; first floating electrodes adjacent to each other in the ceramic body in the thickness direction thereof and formed in pairs, misaligned with the first and second internal electrodes in the thickness direction, and having both end portions overlapped with portions of the first and second internal electrodes, respectively; and at least one or more second floating electrodes adjacent to each other in the ceramic body in the thickness direction thereof and formed in pairs, misaligned with the first and second internal electrodes in the thickness direction, having both end portions overlapped with portions of the first and second internal electrodes, respectively, and shifted with respect to the first floating electrodes in a length direction of the ceramic body, wherein lengths of portions of the first and second floating electrodes overlapped with the portions of the first internal electrodes are different from those of portions of the first and second floating electrodes overlapped with the portions of the second internal electrodes.

Distances between the second floating electrode and the end surfaces of the ceramic body may correspond to 5% or greater of an overall length of the ceramic body.

The multilayer ceramic capacitor may further include first and second dummy electrodes disposed on a dielectric layer having the first floating electrode formed thereon within the ceramic body and exposed through the end surfaces of the ceramic body, respectively.

The multilayer ceramic capacitor may further include third and fourth dummy electrodes disposed on a dielectric layer having the second floating electrode formed thereon within the ceramic body and exposed through the end surfaces of the ceramic body, respectively.

The first and second dummy electrodes may be shifted with respect to the third and fourth dummy electrodes in the length direction of the ceramic body.

The multilayer ceramic capacitor may further include third floating electrodes each disposed on the dielectric layer having the first and second internal electrodes formed therein within the ceramic body and spaced apart from the first and second internal electrodes, respectively.

The third floating electrodes may be overlapped with the first and second floating electrodes.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
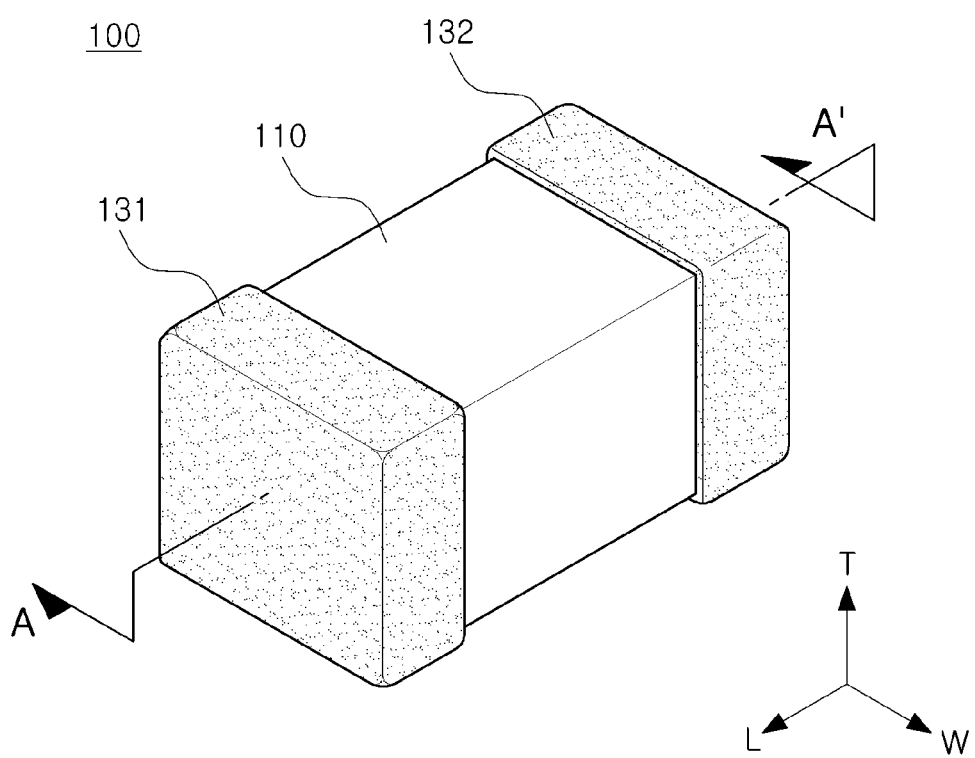
FIG. 1 is a perspective view schematically showing a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In addition, directions of a multilayer ceramic capacitor according to embodiments of the present disclosure will be defined. L, W and T shown in FIG. 1 refer to a length direction, a width direction, and a thickness direction, respectively.

Multilayer Ceramic Capacitor

Figure 2:
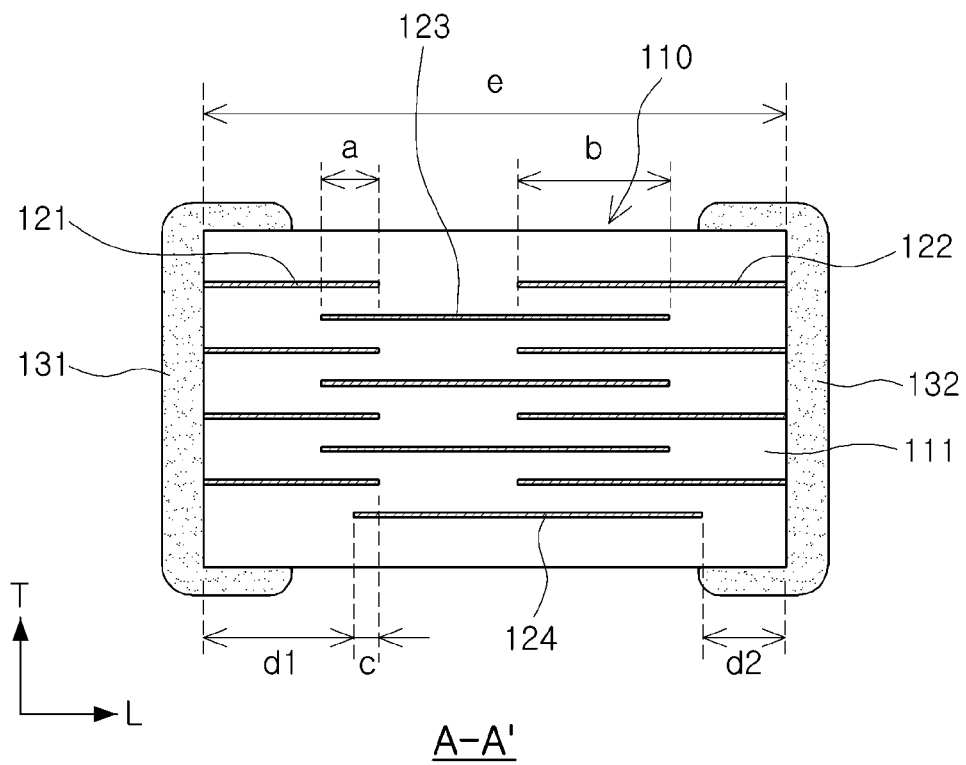
FIG. 2 is a cross-sectional view taken along line A-A' of FIG. 1.

FIG. 1 is a perspective view schematically showing a multilayer ceramic capacitor according to an exemplary embodiment of the present disclosure, and FIG. 2 is a cross-sectional view taken along line A-A' of FIG. 1.

Referring to FIGS. 1 and 2, a multilayer ceramic capacitor 100 according to an exemplary embodiment of the present disclosure may include a ceramic body 110 having a plurality of dielectric layers 111 stacked therein, first and second external electrodes 131 and 132, a plurality of first and second internal electrodes 121 and 122, a plurality of first floating electrodes 123, and at least one second floating electrode 124.

The ceramic body 110 may be formed by stacking the plurality of dielectric layers 111 in a thickness direction and then performing a sintering process, wherein adjacent dielectric layers 111 may be integrated such that boundaries therebetween are not readily apparent. Here, the ceramic body 110 may have a hexahedral shape.

In the present embodiment, the ceramic body 110 may have a relatively large size of 16 mm×8 mm or greater, thereby exhibiting high voltage and low capacitance characteristics, but the present disclosure is not limited thereto.

The dielectric layers 111 may contain a ceramic material having high permittivity, for example, a barium titanate ($BaTiO_3$)-based ceramic powder, and the like. However, the present disclosure is not limited thereto as long as sufficient capacitance may be obtained.

Further, various ceramic additives such as a transition metal oxide or carbide, a rare-earth element, magnesium (Mg), aluminum (Al), and the like, an organic solvent, a plasticizer, a binder, a dispersant, or the like, besides the ceramic powder, may be added to the dielectric layer 111, as necessary.

Referring to FIG. 2, in a cross section of the multilayer ceramic capacitor 100 cut in a length-thickness direction thereof, a portion of the multilayer ceramic capacitor 100 in which the first and second internal electrodes 121 and 122 are not formed may be referred to as a margin portion.

Here, margin portions positioned at upper and lower portions of the ceramic body 110 in a thickness direction thereof may be referred to as upper and lower cover layers, respectively.

The upper and lower cover layers may be formed by sintering a plurality of ceramic sheets, and may have a structure similar to that of the dielectric layers 111 positioned in a central portion of the ceramic body 110 except that the cover layers do not have any internal electrodes formed thereon.

In addition, the first and second external electrodes 131 and 132 may be formed on both end surfaces of the ceramic body 110, respectively, so as to be electrically connected to the first and second internal electrodes 121 and 122 exposed through the end surfaces, respectively.

The first and second external electrodes 131 and 132 may be formed of a conductive metal, for example, at least one of silver (Ag), lead (Pb), platinum (Pt), nickel (Ni), and copper (Cu), and alloys thereof, but the present disclosure is not limited thereto.

Meanwhile, if necessary, first and second plated layers (not shown) may be formed on the first and second external electrodes 131 and 132.

The first and second plated layers each may include a nickel (Ni) plated layer formed on the first and second external electrodes 131 and 132 and a tin (Sn) plated layer formed on the nickel (Ni) plated layer.

The first and second (Ni) layers are provided to increase adhesion strength between the multilayer ceramic capacitor 100 and a printed circuit board when the multilayer ceramic capacitor 100 is mounted on the printed circuit board, or the like, by using a solder, or the like. The plating process may be performed by a method known in the art, and a lead-free plating process may be advisable in consideration of eco-friendly factors, but the present disclosure is not limited thereto.

The first and second internal electrodes 121 and 122 having opposite polarities may be formed on at least one surface of the same ceramic sheet forming one dielectric layer 111 while being spaced apart from each other within the ceramic body 100, and may be exposed through both end surfaces of the ceramic body 110, respectively.

The first and second internal electrodes 121 and 122 exposed through the respective end surfaces of the ceramic body 110 may be electrically connected to the first and second external electrodes 131 and 132, respectively.

In addition, the first and second internal electrodes 121 and 122 may be formed of a conductive metal, for example, one of silver (Ag), lead (Pb), platinum (Pt), nickel (Ni), and copper (Cu), and alloys thereof, but are not limited thereto.

Both end portions of the first floating electrode 123 may be overlapped with end portions of the first and second internal electrodes 121 and 122 spaced apart from each other.

Here, a length a of an overlap portion between one end portion of the first floating electrode 123 and the first internal electrode 121 may be different from a length b of an overlap portion between the other end portion of the first floating electrode 123 and the second internal electrode 122.

In the present embodiment, the length b is greater than the length a. However, the length a may be greater than the length b contrary to the above-described case, if necessary, and the present disclosure is not limited thereto.

At least one or more second floating electrodes 124 may be stacked inside the ceramic body 110, and both end portions of the second floating electrode may be overlapped with end portions of the first and second internal electrodes 121 and 122 spaced apart from each other.

Here, a length of an overlap portion between one end portion of the second floating electrode 124 and the first internal electrode 121 may be different from a length of an overlap portion between the other end portion of the second floating electrode 124 and the second internal electrode 122.

In addition, the second floating electrode 124 may be shifted with respect to the first floating electrodes 123 in a length direction of the ceramic body.

Here, distances d1 and d2 between the second floating electrode 124 and both end surfaces of the ceramic body 110 may correspond to 5% or greater of an overall length e of the ceramic body 110.

The following Table 1 shows a cutting defect rate and breakdown voltage (BDV) depending on changes in e, d1, and d2 values. Here, a size of a chip according to Inventive Example of the present disclosure may be length×width of 16×8 (mm).

TABLE 1

| # | e (μm) | d1 (μm) | d2 (μm) | d1/e | d2/e | Cutting Defect Rate | BDV [v] |
|---|--------|---------|---------|------|------|---------------------|---------|
| 1 | 1550 | 5 | 395 | 0.3% | 25% | 100% | short |
| 2 | 1550 | 10 | 390 | 0.6% | 25% | 100% | short |
| 3 | 1550 | 15 | 385 | 1.0% | 25% | 83% | 150 |
| 4 | 1550 | 30 | 370 | 1.9% | 24% | 52% | 540 |
| 5 | 1550 | 45 | 355 | 2.9% | 23% | 22% | 1534 |
| 6 | 1550 | 65 | 335 | 4.2% | 22% | 5.4% | 1528 |
| 7 | 1550 | 80 | 320 | 5.2% | 21% | 0.30% | 1530 |
| 8 | 1550 | 110 | 290 | 7.1% | 19% | 0.25% | 1542 |
| 9 | 1550 | 125 | 275 | 8.1% | 18% | 0.40% | 1528 |
| 10 | 1550 | 140 | 260 | 9.0% | 17% | 0.30% | 1530 |
| 11 | 1550 | 155 | 245 | 10.0% | 16% | 0.33% | 1541 |

Referring to Table 1, in samples 1 to 6 having ratios of d1/e lower than 5.0%, cutting defect rates were 5.4% or higher. In particular, in samples 1 to 4 having ratios of d1/e lower than 2.0%, BDVs were also less than 600 v, which is unstable.

Therefore, it could be appreciated that a desired range of d1/e and d2/e, a ratio of the length of the ceramic body to a margin thereof with respect to the second floating electrode in the length direction of the ceramic body may be 5% or higher in order to achieve stable BDV and prevent cutting defects.

Figure 3:
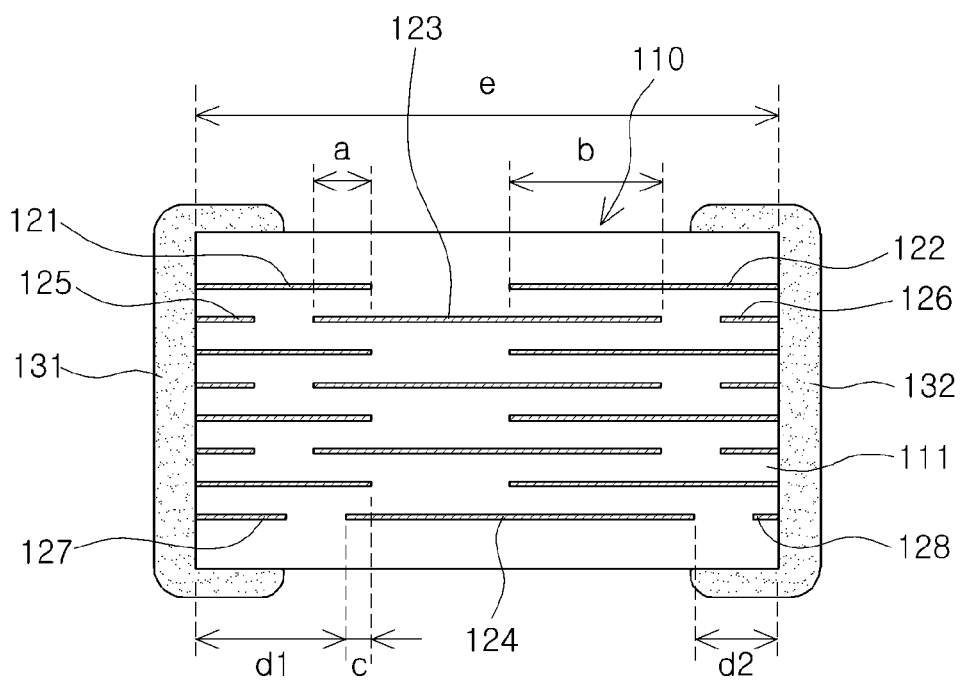
FIG. 3 is a cross-sectional view showing another example of the multilayer ceramic capacitor of FIG. 2 having dummy electrodes added thereto.

Referring to FIG. 3, first and second dummy electrodes 125 and 126 may face each other, having the first floating electrode 123 therebetween, on the dielectric layer 111 having the first floating electrode 123 formed thereon within the ceramic body 110, while being exposed through both end surfaces of the ceramic body 110, respectively.

Edges of the first and second dummy electrodes 125 and 126 exposed through both end surfaces of the ceramic body 110, respectively, may be connected to the first and second external electrodes 131 and 132, respectively.

In addition, third and fourth dummy electrodes 127 and 128 may face each other, having the second floating electrode 124 therebetween, on the dielectric layer 111 having the second floating electrode 124 formed thereon within the ceramic body 110, while being exposed through both end surfaces of the ceramic body 110.

Edges of the third and fourth dummy electrodes 127 and 128 exposed through both end surfaces of the ceramic body 110, respectively, may be connected to the first and second external electrodes 131 and 132, respectively.

Here, the third and fourth dummy electrodes 127 and 128 may be shifted with respect to the first and second dummy electrodes 125 and 126 in the length direction of the ceramic body, respectively.

Figure 4:
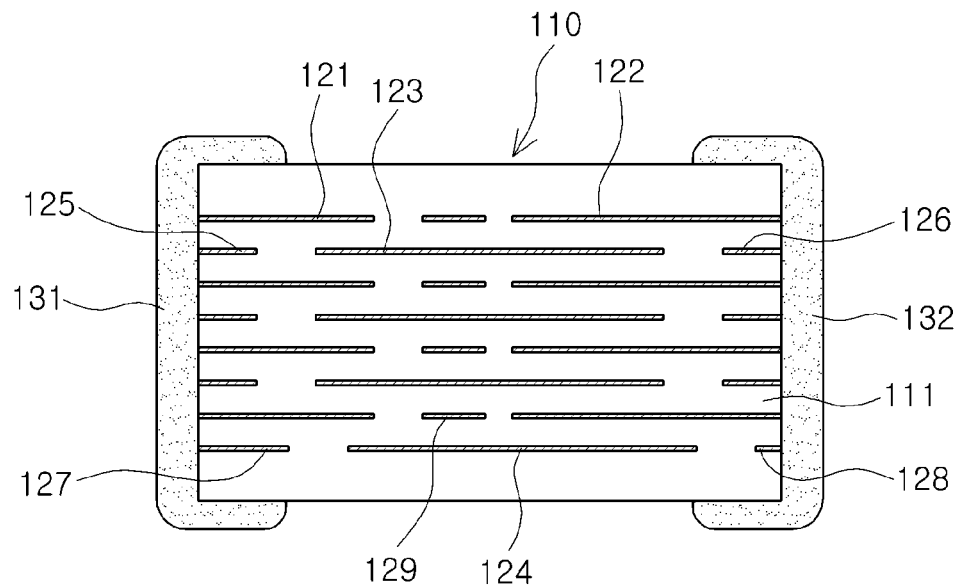
FIG. 4 is a cross-sectional view showing another example of the multilayer ceramic capacitor of FIG. 3 having third floating electrodes added thereto.

Referring to FIG. 4, a third floating electrode 129 may be formed on the dielectric layer 111 having the first and second internal electrodes 121 and 122 formed thereon within the ceramic body 110, while being spaced apart from the first and second internal electrodes 121 and 122.

Here, the third floating electrodes 129 may be overlapped with the first and second floating electrodes 123 and 124 positioned above and below the third floating electrodes 129.

Figure 8A:
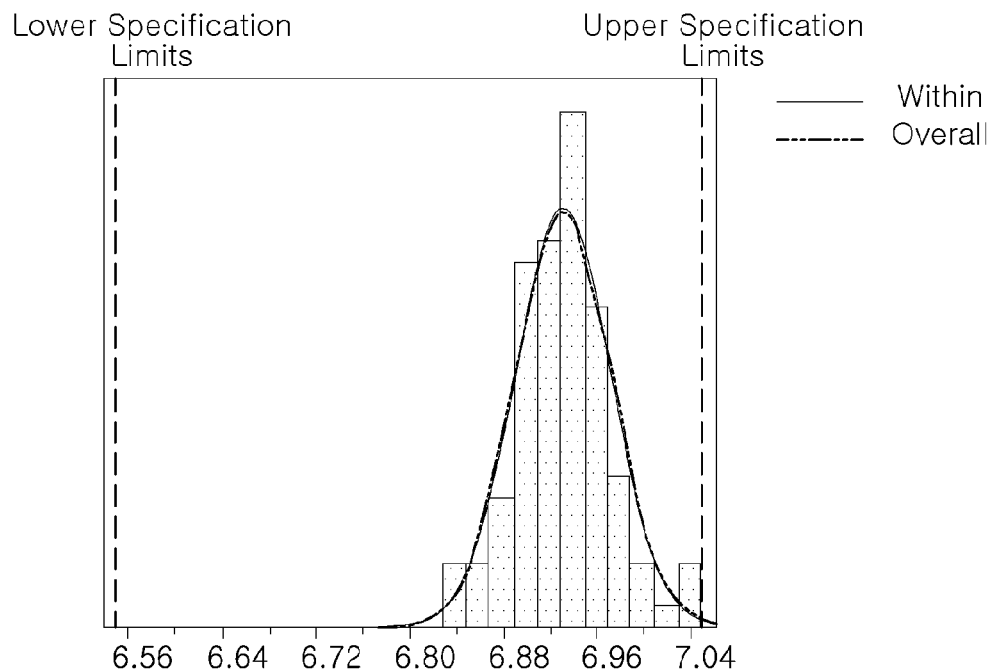
FIG. 8A is a graph showing capacitance distribution of a preliminary product at a deviation of ±0.25 pF when a multilayer ceramic capacitor is designed to have 6.8 pF.
Figure 8B:
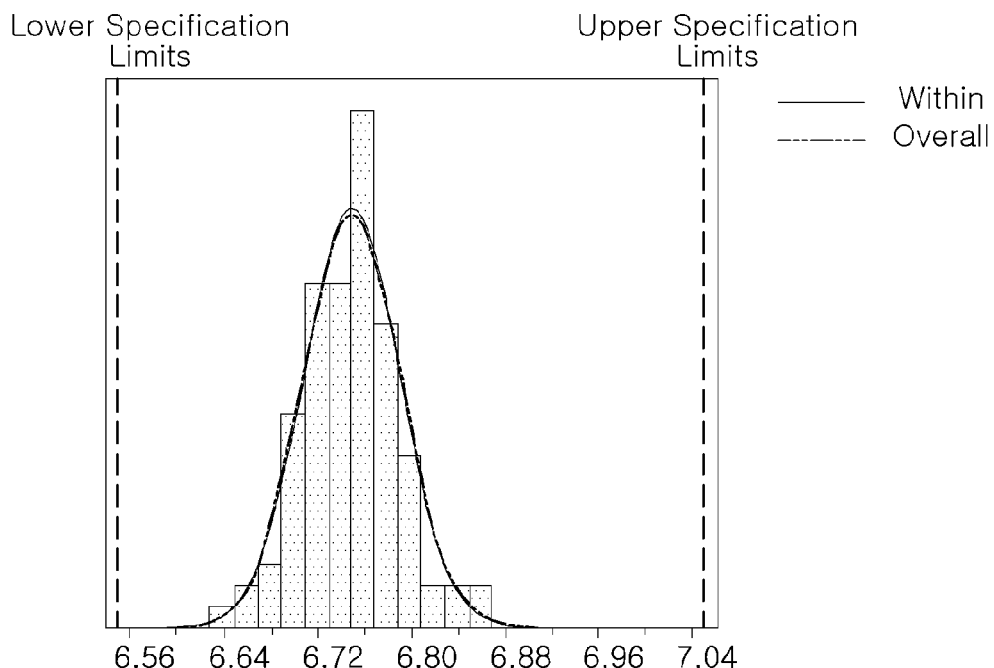
FIG. 8B is a graph showing capacitance distribution of a multilayer ceramic capacitor having a structure in which lengths of overlap portions between both end portions of first floating electrodes and first and second internal electrodes are different from each other at a deviation of ±0.25 pF when the multilayer ceramic capacitor is designed to have 6.8 pF.

FIG. 8A is a graph is a graph showing capacitance distribution of a preliminary product (Comparative Example 1) at a deviation of ±0.25 pF when a multilayer ceramic capacitor is designed to have 6.8 pF; FIG. 8B is a graph showing capacitance distribution of a multilayer ceramic capacitor (Comparative Example 2) having a structure in which lengths of overlap portions between both end portions of first floating electrodes and first and second internal electrodes are different from each other at a deviation of ±0.25 pF when the multilayer ceramic capacitor is designed to have 6.8 pF; and FIG. 8C is a graph showing capacitance distribution of a multilayer ceramic capacitor (Inventive Example 1) according to an exemplary embodiment of the present disclosure at a deviation of ±0.25 pF when the multilayer ceramic capacitor is designed to have 6.8 pF.

Figure 8C:
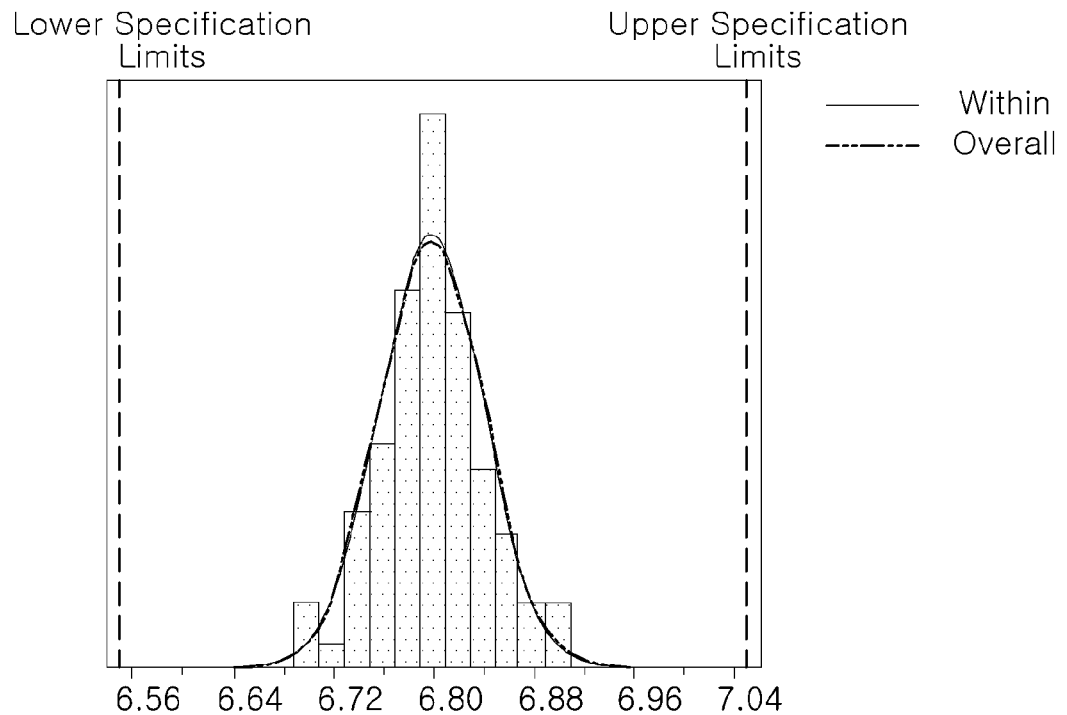
FIG. 8C is a graph showing capacitance distribution of a multilayer ceramic capacitor according to an exemplary embodiment of the present disclosure at a deviation of ±0.25 pF when the multilayer ceramic capacitor is designed to have 6.8 pF.

With reference to FIGS. 8A through 8C, in the case of a relatively large deviation of ±0.25 pF, it would be easy for Comparative Example 2, in which the lengths of the overlap portions between both end portions of the first floating electrodes and the first and second internal electrodes are different from each other, to achieve a designed target capacitance value of 6.8 pF, as compared to the preliminary product of Comparative Example 1.

In addition, it would be easy for Inventive Example 1 having a structure in which lengths of overlap portions between both end portions of first floating electrodes and first and second internal electrodes are different from each other and a second floating electrode is shifted with respect to the first floating electrode in a length direction of a ceramic body, to achieve a designed target capacitance value of 6.8 pF, as compared to Comparative Example 1.

Further, in comparing Comparative Example 2 and Inventive Example 1, in the case of a relatively large deviation of ±0.25 pF, a difference in capacitance distribution between Comparative Example 2 and Inventive Example 1 was not large.

Figure 9A:
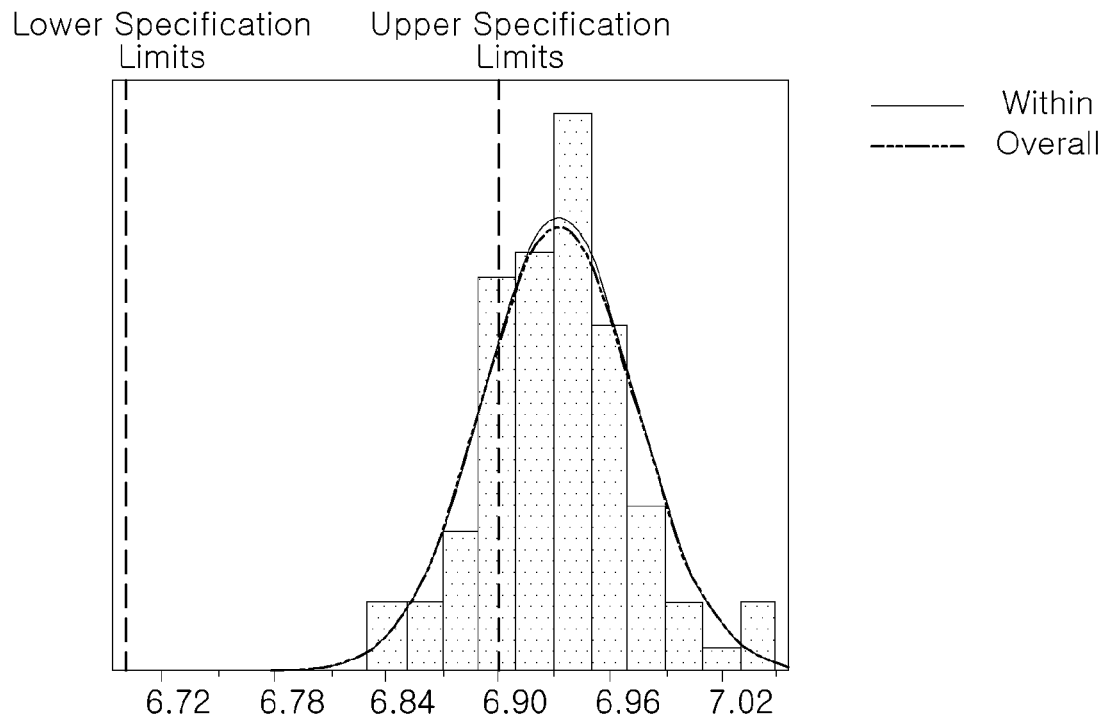
FIG. 9A is a graph showing capacitance distribution of a preliminary product at a deviation of ±0.1 pF when a multilayer ceramic capacitor is designed to have 6.8 pF.
Figure 9B:
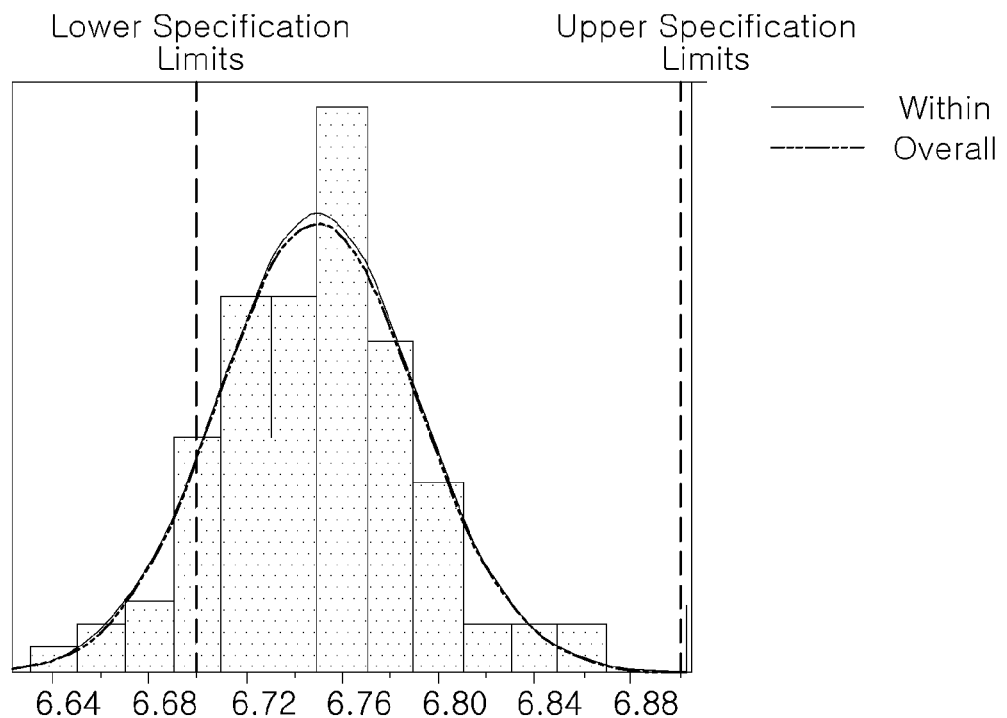
FIG. 9B is a graph showing capacitance distribution of a multilayer ceramic capacitor having a structure in which lengths of overlap portions between both end portions of first floating electrodes and first and second internal electrodes are different from each other at a deviation of ±0.1 pF when the multilayer ceramic capacitor is designed to have 6.8 pF.

FIG. 9A is a graph showing capacitance distribution of a preliminary product (Comparative Example 3) at a deviation of ±0.1 pF when a multilayer ceramic capacitor is designed to have 6.8 pF; FIG. 9B is a graph showing capacitance distribution of a multilayer ceramic capacitor (Comparative Example 4) having a structure in which lengths of overlap portions between both end portions of first floating electrodes and first and second internal electrodes are different from each other at a deviation of ±0.1 pF when the multilayer ceramic capacitor is designed to have 6.8 pF; and FIG. 9C is a graph showing capacitance distribution of a multilayer ceramic capacitor (Inventive Example 2) according to an exemplary embodiment of the present disclosure at a deviation of ±0.1 pF when the multilayer ceramic capacitor is designed to have 6.8 pF.

Figure 9C:
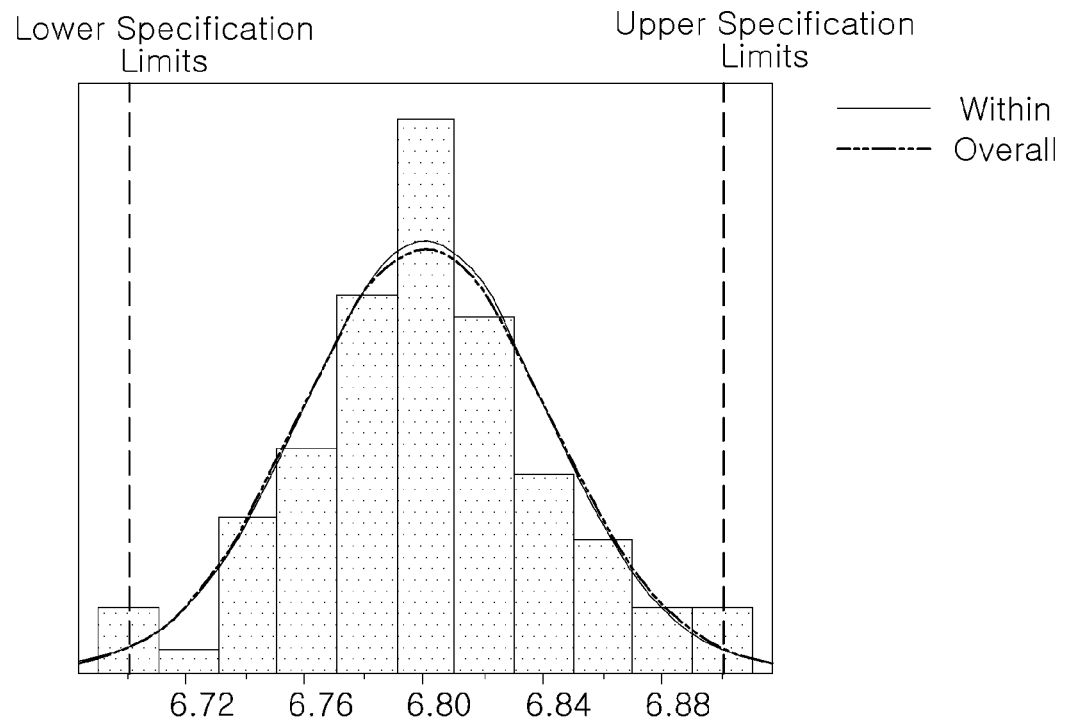
FIG. 9C is a graph showing capacitance distribution of a multilayer ceramic capacitor according to an exemplary embodiment of the present disclosure at a deviation of ±0.1 pF when the multilayer ceramic capacitor is designed to have 6.8 pF.

With reference to FIGS. 9A to 9C that in the case of a small deviation of ±0.1 pF, it would be difficult for Comparative Example 4 in which the lengths of the overlap portions between both end portions of the first floating electrodes and the first and second internal electrodes are different from each other, to achieve a designed target capacitance value of 6.8 pF, thereby having an influence on manufacturing yield, as compared to the preliminary product of Comparative Example 3.

Meanwhile, it would be easy for Inventive Example 2 having a structure in which lengths of overlap portions between both end portions of first floating electrodes and first and second internal electrodes are different from each other and a second floating electrode is shifted with respect to the first floating electrode in a length direction of a ceramic body, to achieve a designed target capacitance value of 6.8 pF, as compared to Comparative Examples 3 and 4.

Therefore, it could be appreciated that in a case in which the first floating electrodes are shifted with respect to the second floating electrodes in the length direction according to the exemplary embodiment of the present disclosure, excellent accuracy of the target capacitance value may be obtained, such that a low capacitance target value may be minutely adjusted, and a difference in capacitance between a preliminary product and a final product may be reduced.

Modified Examples

Figure 5:
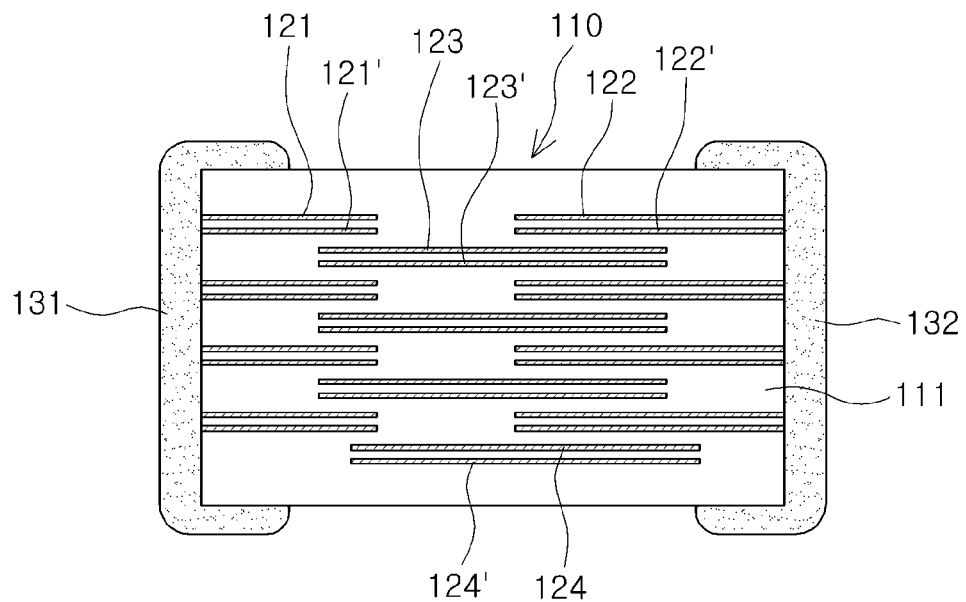
FIG. 5 is a cross-sectional view schematically showing a multilayer ceramic capacitor according to another exemplary embodiment of the present disclosure.
Figure 6:
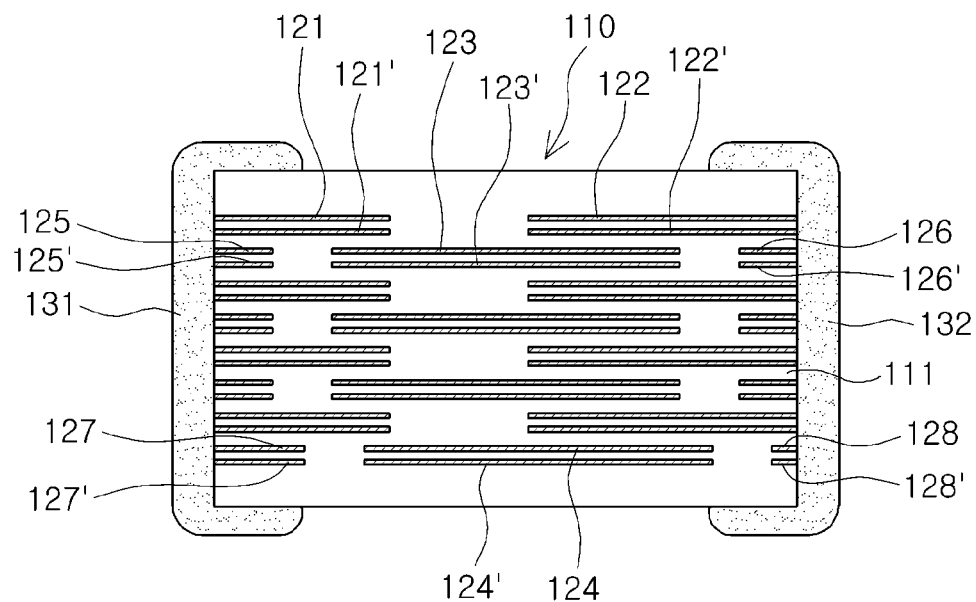
FIG. 6 is a cross-sectional view showing another example of the multilayer ceramic capacitor of FIG. 5 having dummy electrodes added thereto.
Figure 7:
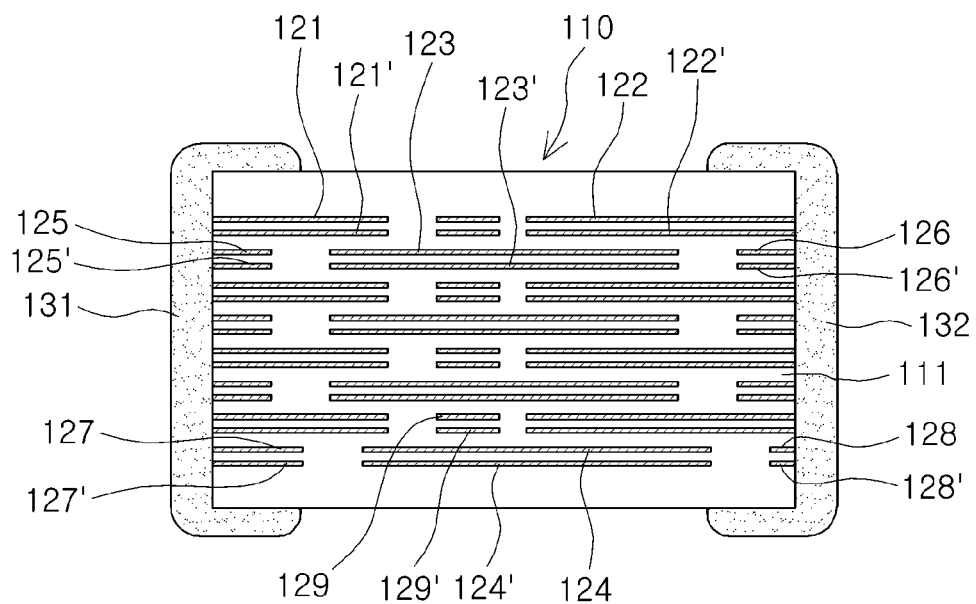
FIG. 7 is a cross-sectional view showing another example of the multilayer ceramic capacitor of FIG. 6 having third floating electrodes added thereto.

FIGS. 5 to 7 are side cross-sectional views schematically showing inner structures of multilayer ceramic capacitors according to other embodiments of the present disclosure.

Here, the multilayer ceramic capacitors according to the present embodiments have the same constitution including the ceramic body 110, the first and second external electrodes 131 and 132, the first and second internal electrodes 121 and 122, and the first and second floating electrodes 123 and 124, as that of the multilayer ceramic capacitor described in the previous embodiment of the present disclosure, a detailed description thereof will be omitted.

In the present embodiment, the internal electrodes may be adjacent to each other in a thickness direction of the ceramic body to thereby be formed in pairs.

FIG. 5 shows first internal electrodes 121 and 121', second internal electrodes 122 and 122', first floating electrodes 123 and 123', and second floating electrodes 124 and 124', all of which are formed in pairs in the thickness direction of the ceramic body, respectively.

FIG. 6 shows first dummy electrodes 125 and 125', second dummy electrodes 126 and 126', third dummy electrodes 127 and 127', and fourth dummy electrodes 128 and 128', all of which are formed in pairs in the thickness direction of the ceramic body, respectively.

FIG. 7 shows third floating electrodes 129 and 129' formed in pairs in the thickness direction of the ceramic body.

As set forth above, in a multilayer ceramic capacitor having high voltage and low capacitance characteristics according to exemplary embodiments of the present disclosure, both end portions of the floating electrode overlapped with the first and second internal electrodes are adjusted to have different lengths and at least one second floating electrode is disposed to be shifted with respect to the first floating electrodes in length-thickness directions of the ceramic body. Therefore, without increasing the thickness of dielectric layers or increasing the number of stacked internal electrodes, the capacitance of the multilayer ceramic capacitor may be minutely adjusted and a difference in capacitance between a preliminary product and a final product may be reduced.

While exemplary embodiments have been shown and described above, it will be apparent to those skilled in the art that modifications and variations could be made without departing from the spirit and scope of the present disclosure as defined by the appended claims.

What is claimed is:
1. A multilayer ceramic capacitor, comprising:
a ceramic body having a plurality of dielectric layers stacked in the ceramic body;
first and second external electrodes disposed on end surfaces of the ceramic body, respectively;
first and second internal electrodes disposed on one dielectric layer to be spaced apart from each other within the ceramic body and extended from the end surfaces of the ceramic body to be electrically connected to the first and second external electrodes, respectively;

first floating electrodes misaligned with the first and second internal electrodes in a thickness direction of the ceramic body within the ceramic body and having end portions overlapped with portions of the first and second internal electrodes, respectively; and at least one second floating electrode misaligned with the first and second internal electrodes in the thickness direction of the ceramic body within the ceramic body, having end portions overlapped with portions of the first and second internal electrodes, respectively, and shifted with respect to the first floating electrodes in a length direction of the ceramic body, wherein lengths of portions of the first and second floating electrodes overlapped with the portions of the first internal electrodes are different from those of portions of the first and second floating electrodes overlapped with the portions of the second internal electrodes, and distances between the second floating electrode and the end surfaces of the ceramic body correspond to 5% or greater of an overall length of the ceramic body.

2. The multilayer ceramic capacitor of claim 1, further comprising first and second dummy electrodes disposed on a dielectric layer having the first floating electrode formed thereon within the ceramic body and exposed through the end surfaces of the ceramic body, respectively.

3. The multilayer ceramic capacitor of claim 1, further comprising third and fourth dummy electrodes disposed on a dielectric layer having the second floating electrode formed thereon within the ceramic body and exposed through the end surfaces of the ceramic body, respectively.

4. The multilayer ceramic capacitor of claim 1, further comprising:
first and second dummy electrodes disposed on a dielectric layer having the first floating electrode formed thereon within the ceramic body and exposed through the end surfaces of the ceramic body, respectively; and
third and fourth dummy electrodes disposed on a dielectric layer having the second floating electrode formed thereon within the ceramic body and exposed through the end surfaces of the ceramic body, respectively,
wherein the first and second dummy electrodes are shifted with respect to the third and fourth dummy electrodes in the length direction of the ceramic body.

5. The multilayer ceramic capacitor of claim 1, further comprising third floating electrodes each disposed on the dielectric layer having the first and second internal electrodes formed thereon within the ceramic body and spaced apart from the first and second internal electrodes, respectively.

6. The multilayer ceramic capacitor of claim 5, wherein the third floating electrodes are overlapped with the first and second floating electrodes.

7. The multilayer ceramic capacitor of claim 1, further comprising:
first and second dummy electrodes disposed on a dielectric layer having the first floating electrode formed thereon within the ceramic body and exposed through the end surfaces of the ceramic body, respectively; and
third floating electrodes each disposed on the dielectric layer having the first and second internal electrodes formed thereon within the ceramic body and spaced apart from the first and second internal electrodes, respectively.

8. The multilayer ceramic capacitor of claim 1, further comprising:
third and fourth dummy electrodes disposed on a dielectric layer having the second floating electrode formed thereon within the ceramic body and exposed through the end surfaces of the ceramic body, respectively; and
third floating electrodes disposed on the dielectric layer having the first and second internal electrodes formed thereon within the ceramic body and spaced apart from the first and second internal electrodes, respectively.

9. The multilayer ceramic capacitor of claim 1, further comprising:
first and second dummy electrodes disposed on a dielectric layer having the first floating electrode formed thereon within the ceramic body and exposed through the end surfaces of the ceramic body, respectively;
third and fourth dummy electrodes disposed on a dielectric layer having the second floating electrode formed thereon within the ceramic body and exposed through the end surfaces of the ceramic body, respectively; and
third floating electrodes each disposed on the dielectric layer having the first and second internal electrodes formed thereon within the ceramic body and spaced apart from the first and second internal electrodes, respectively,
wherein the first and second dummy electrodes are shifted with respect to the third and fourth dummy electrodes in the length direction of the ceramic body.

10. A multilayer ceramic capacitor, comprising:
a ceramic body having a plurality of dielectric layers stacked therein;
first and second external electrodes disposed on end surfaces of the ceramic body, respectively;
first and second internal electrodes adjacent to each other in the ceramic body in a thickness direction thereof and formed in pairs, spaced apart from each other and extended from the end surfaces of the ceramic body to be electrically connected to the first and second external electrodes, respectively;
first floating electrodes adjacent to each other in the ceramic body in the thickness direction thereof and formed in pairs, misaligned with the first and second internal electrodes in the thickness direction, and having end portions overlapped with portions of the first and second internal electrodes, respectively; and
at least one or more second floating electrodes adjacent to each other in the ceramic body in the thickness direction thereof and formed in pairs, misaligned with the first and second internal electrodes in the thickness direction, having both end portions overlapped with portions of the first and second internal electrodes, respectively, and shifted with respect to the first floating electrodes in a length direction of the ceramic body,
wherein lengths of portions of the first and second floating electrodes overlapped with the portions of the first internal electrodes are different from those of portions of the first and second floating electrodes overlapped with the portions of the second internal electrodes, and
distances between the second floating electrode and the end surfaces of the ceramic body correspond to 5% or greater of an overall length of the ceramic body.

11. The multilayer ceramic capacitor of claim 10, further comprising first and second dummy electrodes adjacent to each other in the ceramic body in the thickness direction thereof and formed in pairs, disposed on dielectric layers having the first floating electrodes formed thereon, and exposed through the end surfaces of the ceramic body, respectively.

12. The multilayer ceramic capacitor of claim 10, further comprising third and fourth dummy electrodes adjacent to each other in the ceramic body in the thickness direction thereof and formed in pairs, disposed on dielectric layers having the second floating electrodes formed thereon, and exposed through the end surfaces of the ceramic body, respectively.

13. The multilayer ceramic capacitor of claim 10, further comprising:
    first and second dummy electrodes adjacent to each other in the ceramic body in the thickness direction thereof and formed in pairs, disposed on dielectric layers having the first floating electrodes formed thereon, and exposed through the end surfaces of the ceramic body, respectively; and
    third and fourth dummy electrodes adjacent to each other in the ceramic body in the thickness direction thereof and formed in pairs, disposed on dielectric layers having the second floating electrodes formed thereon, and exposed through the end surfaces of the ceramic body, respectively,
    wherein the first and second dummy electrodes are shifted with respect to the third and fourth dummy electrodes in the length direction of the ceramic body.

14. The multilayer ceramic capacitor of claim 10, further comprising third floating electrodes adjacent to each other in the ceramic body in the thickness direction thereof and formed in pairs, and spaced apart from the first and second internal electrodes on dielectric layers having the first and second internal electrodes formed thereon.

15. The multilayer ceramic capacitor of claim 14, wherein the third floating electrodes are overlapped with the first and second floating electrodes.

16. The multilayer ceramic capacitor of claim 10, further comprising:
    first and second dummy electrodes adjacent to each other in the ceramic body in the thickness direction thereof and formed in pairs, disposed on dielectric layers having the first floating electrodes formed thereon, and exposed through the end surfaces of the ceramic body, respectively; and
    third floating electrodes spaced apart from the first and second internal electrodes on dielectric layers having the first and second internal electrodes formed thereon.

17. The multilayer ceramic capacitor of claim 10, further comprising:
    third and fourth dummy electrodes adjacent to each other in the ceramic body in the thickness direction thereof and formed in pairs, disposed on dielectric layers having the second floating electrodes formed thereon, and exposed through the end surfaces of the ceramic body, respectively; and
    third floating electrodes adjacent to each other in the ceramic body in the thickness direction thereof and formed in pairs, and spaced apart from the first and second internal electrodes on dielectric layers having the first and second internal electrodes formed thereon.

18. The multilayer ceramic capacitor of claim 10, further comprising:
    first and second dummy electrodes adjacent to each other in the ceramic body in the thickness direction thereof and formed in pairs, disposed on dielectric layers having the first floating electrodes formed thereon, and exposed through the end surfaces of the ceramic body, respectively;
    third and fourth dummy electrodes adjacent to each other in the ceramic body in the thickness direction thereof and formed in pairs, disposed on dielectric layers having the second floating electrodes formed thereon, and exposed through the end surfaces of the ceramic body, respectively; and
    third floating electrodes adjacent to each other in the ceramic body in the thickness direction thereof and formed in pairs, and spaced apart from the first and second internal electrodes on dielectric layers having the first and second internal electrodes formed thereon,
    wherein the first and second dummy electrodes are shifted with respect to the third and fourth dummy electrodes in the length direction of the ceramic body.

* * * * *